United States Patent [19]

Rosenberg

[11] Patent Number: 5,406,190

[45] Date of Patent: Apr. 11, 1995

[54] DEVICE FOR GENERATING ELECTRICAL ENERGY HAVING AN A.C. GENERATOR COUPLED TO A TURBINE

[75] Inventor: Heinz Rosenberg, Wöllersdorf, Austria

[73] Assignee: Siemens Aktiengesellschaft, Munich, Germany

[21] Appl. No.: 136,738

[22] Filed: Oct. 14, 1993

Related U.S. Application Data

[63] Continuation of Ser. No. 972,667, Nov. 6, 1992, abandoned.

[30] Foreign Application Priority Data

Nov. 7, 1991 [DE] Germany .................. 41 36 692.1

[51] Int. Cl.⁶ .................. H02K 21/04; H02P 9/48
[52] U.S. Cl. ........................ 322/32; 322/29; 322/35; 322/96
[58] Field of Search .............. 322/29, 32, 35, 95, 322/96

[56] References Cited

U.S. PATENT DOCUMENTS

| | | | |
|---|---|---|---|
| 3,121,838 | 2/1964 | Mozic | 322/96 X |
| 3,813,593 | 5/1974 | Tice et al. | 322/58 X |
| 4,371,828 | 2/1983 | Tornatore et al. | 322/32 |
| 4,417,194 | 11/1983 | Curtiss et al. | |
| 4,532,465 | 7/1985 | Renard | |
| 4,701,691 | 10/1987 | Nickoladze | 322/32 |
| 4,752,751 | 6/1988 | Walker | |
| 4,785,228 | 11/1988 | Goddard | 322/29 |

FOREIGN PATENT DOCUMENTS

| | | |
|---|---|---|
| 0099803 | 7/1983 | European Pat. Off. . |
| 0311717 | 4/1989 | European Pat. Off. . |
| 0568353 | 1/1933 | Germany . |
| 0844028 | 7/1952 | Germany . |
| 127783 | 10/1977 | Germany . |
| 3304664 | 8/1983 | Germany . |
| 3345210 | 7/1985 | Germany . |
| 3427103 | 9/1990 | Germany . |
| 335157 | 8/1931 | United Kingdom .......... 322/96 |
| 2142451 | 7/1984 | United Kingdom . |
| 1443119A | 12/1988 | U.S.S.R. ....................... 322/35 |

Primary Examiner—Steven L. Stephan
Assistant Examiner—E. To
Attorney, Agent, or Firm—Kenyon & Kenyon

[57] ABSTRACT

A device for generating electrical energy includes at least one a.c. generator which is coupled to a turbine driven by a flowing medium and is connected via capacitive elements to a rectifier with impressed output voltage. The capacitive elements are rated or are able to be controlled in relationship to the inductances existing in the generator electric circuit in a way that allows the resonant frequency of the oscillating circuit made up of the capacitive elements and the inductors to lie above the highest frequency that occurs under field conditions.

16 Claims, 3 Drawing Sheets

DEVICE FOR GENERATING ELECTRICAL ENERGY HAVING AN A.C. GENERATOR COUPLED TO A TURBINE

This is a request for filing a file wrapper continuation application under 37 C.F.R. 1.62 of pending prior application Ser. No. 07/972,667, filed on Nov. 6, 1992, now abandoned for Device for Generating Electrical Energy Having an A.C. Generator Coupled to a Turbine.

BACKGROUND OF THE INVENTION

The present invention relates to a device for generating electrical energy having at least one a.c. generator, which is coupled to a turbine driven by a flowing medium such as wind power or hydro-electric power.

When such a device is a wind-power or a hydroelectric installation, then the motive force exerted by the flowing medium on the turbine is subjected to strong fluctuations. Up until now, to convert into electrical energy the energy contained in the medium as optimally as possible, one used costly control devices to adjust the turbine blades to correspond to the fluctuations of the flowing medium. This required, in turn, a turbine arrangement that included a suitable adjustment mechanism for the blades.

SUMMARY OF THE INVENTION

The present invention is an energy-generating device which will enable the most optimum possible energy conversion without the usual expenditure for controlling systems.

Starting from a minimum rotational speed, at which the synchronous generated voltage of the generator of the device according to the present invention corresponds to the impressed load voltage, the generator supplies a current, whose magnitude is determined by the differential voltage, by which the synchronous generated voltage exceeds the load voltage, and the impedance of the electric circuit. Since the device is always operated below the resonant frequency of the oscillating circuit made up of the capacitive elements and the inductors of the generator's electric circuit, the impedance of the electric circuit decreases with rising frequency and thus with rising rotational speed of the generator. At the same time, the synchronous generated voltage and its surplus overload voltage increases with rising generator speed. This results in a steep, equidirectional dependence of the supplied current on the generator speed. By appropriately adjusting the capacitive elements to the inductances, a proportionality can be achieved in a speed range of at least 1:3 which corresponds with very good approximation for the current and thus for the power output to the third power of the generator speed.

As is well known in the art, the energy inherent in a flowing medium is proportional to the third power of the flow velocity. Therefore, the particular power supply of the flowing medium can be optimally converted into electrical energy without requiring separate closed-loop control and/or open-loop control devices. Thus, since it is not necessary to have an open-loop speed control of the turbine in order to have optimum power conversion, the turbine can be designed without adjustable blades and is therefore relatively simple in its construction.

The smaller the phase shift between the current and the input voltage of the rectifier, the better the desired proportionality is achieved between the current and the third power of the generator speed. Such a phase shift that corresponds to the commutation reactive power and increases with the frequency is able to be diminished or also completely avoided, because power-factor correction capacitors are arranged in parallel with the input of the rectifier or because a controlled rectifier is provided, whose commutation is controlled in a way which allows the supply of commutation reactive power to be avoided.

BRIEF DESCRIPTION OF THE DRAWINGS

The present invention will be clarified in greater detail in the following description on the basis of exemplified embodiments depicted in the attached drawings.

DETAILED DESCRIPTION

Figure 1:
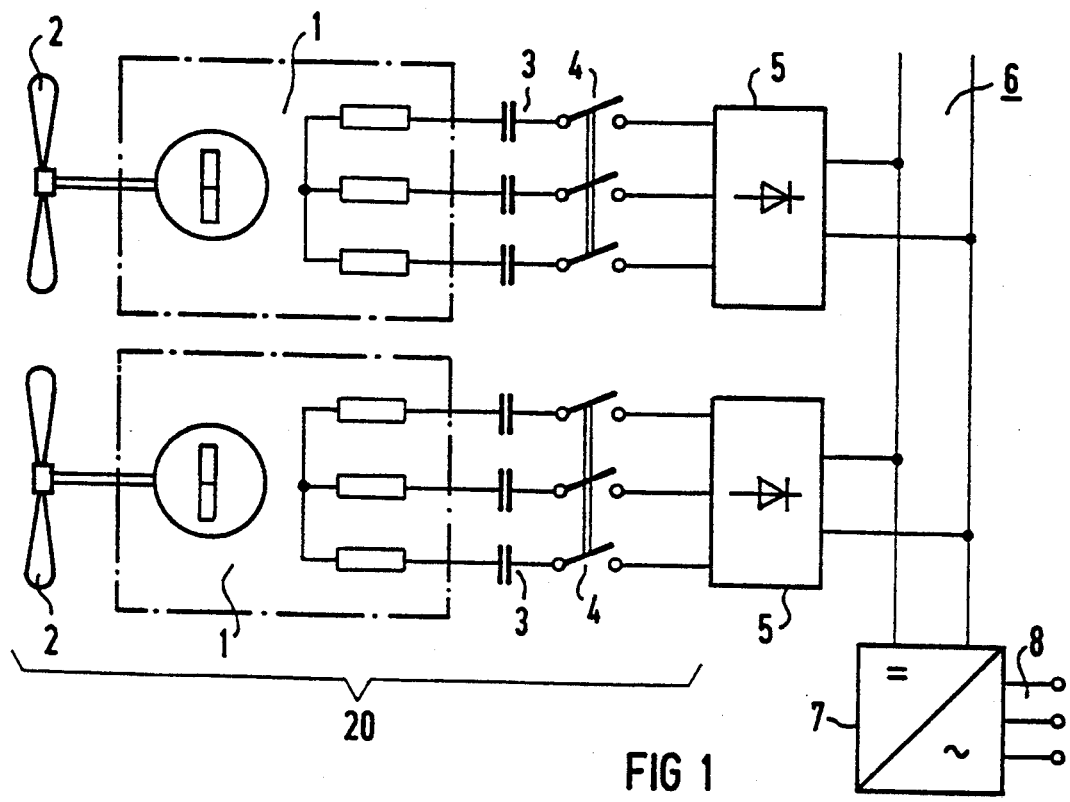
FIG. 1 illustrates a device including two turbine-driven, permanent-magnet excited three-phase generators according to an embodiment of the present invention.

FIG. 1 illustrates a device including two turbine-driven, permanent-magnet excited three-phase generators, each of which each one supplies a rectifier via capacitors and including a switch that is controlled in dependence upon frequency. The rectifiers are connected on the output side to a shared bus bar, which is connected via an inverter to a three-phase power supply.

The device illustrated in FIG. 1 includes a permanent-magnet-excited three-phase generator 1 provided as a constantly excited generator which is driven by a wind or water turbine 2. In the exemplified embodiment illustrated in FIG. 1, a direct actuation of the generator 1 by means of the turbine 2 is indicated. However, depending on the operating conditions, a gear unit can also be provided between the turbine 2 and the generator 1. Each phase winding of the three-phase generator 1 feeds an uncontrolled rectifier 5 via a capacitor 3 and a switch 4 that is able to be controlled in dependence upon frequency. The output of uncontrolled rectifier 5 is connected to a bus bar 6.

Two or more generators 1 may be jointly connected to such a bus bar 6, which feeds a three-phase power supply 8 via an inverter 7. The switch 4 is controlled in dependence upon the frequency f prevailing in the generator electric circuit 20 in a manner that allows it to only be closed below a maximum frequency $f_{max}$, which lies with adequate spacing below the resonant frequency of the oscillating circuit made up of the capacitors 3 and the inductors of the generator electric circuit 20. If the frequency f in the generator electric circuit 20 exceeds the specified maximum frequency $f_{max}$, the switch 4 is opened and the installation is consequently switched off. The turbine 2 then runs in no-load operation and must occasionally be protected through appropriate open-loop control measures against an unacceptable rise in its rotational speed.

Figure 2:
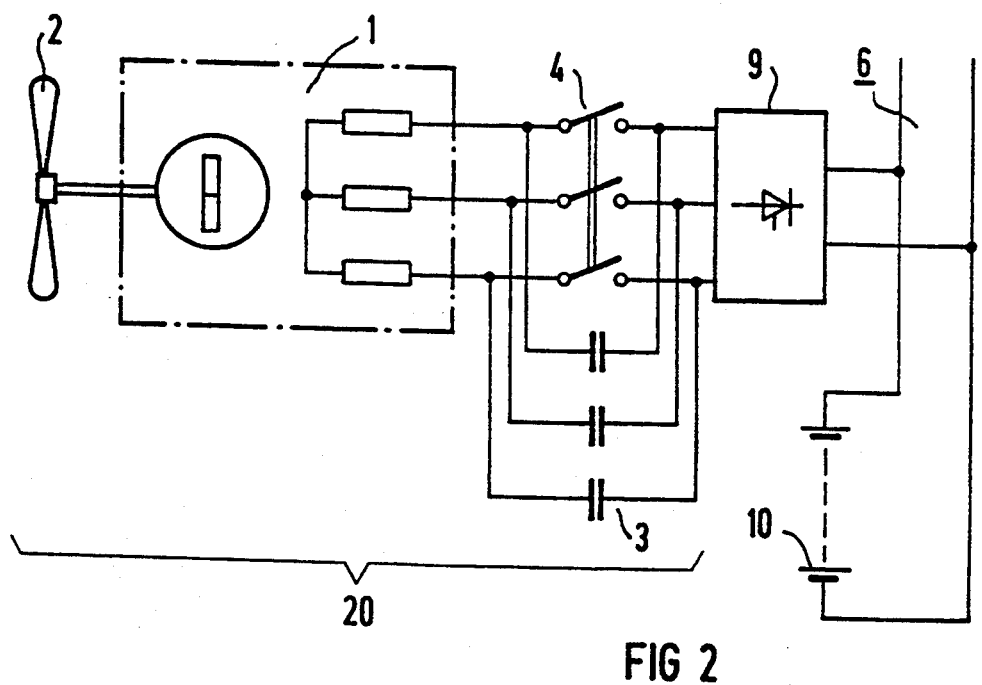
FIG. 2 illustrates a device, in which a generator feeds a rectifier via capacitors according to an embodiment of the present invention.

FIG. 2 illustrates a device, in which a generator feeds a rectifier via capacitors. The capacitors may be short-circuited by means of a switch that is controlled in dependence upon frequency. The switch feeds a rectifier, which is connected to a bus bar that is connected to a battery.

In the embodiment depicted in FIG. 2, the permanent-magnet-excited three-phase generator 1 driven by the turbine 2 works by way of the capacitors 3 on a controllable rectifier 9 which feeds a battery 10 via the bus bar 6. The commutation of the controllable rectifier 9 is controlled in a way that makes it possible to avoid absorbing a commutation reactive power in the upper frequency range as well, that is when the frequency f of the generator electric circuit 20 approaches the specified maximum frequency $f_{max}$. In this manner, phase coincidence is virtually achieved between the input current and input voltage of the rectifier 9. When the maximum frequency $f_{max}$ is exceeded, the capacitors 3 are short-circuited by the switch 4, which is controlled in dependence upon frequency and, in the embodiment illustrated in FIG. 2, is connected in parallel to the capacitors 3. The generator current is then limited to the value of the virtually frequency-independent sustained short-circuit current, which can be kept at an acceptable magnitude by appropriately designing the generator. When a device is designed in this manner, power is still output after the capacitors 3 have been short-circuited. This power no longer corresponds, in fact, to the criterion of an optimum power conversion, but after actuating the switch 4, does prevent a no-load operation of the turbine. Thus, during or after the actuation of the switch 4, open-loop control measures are not absolutely necessary to prevent an unacceptable rise in the rotational speed of the turbine.

Figure 3:
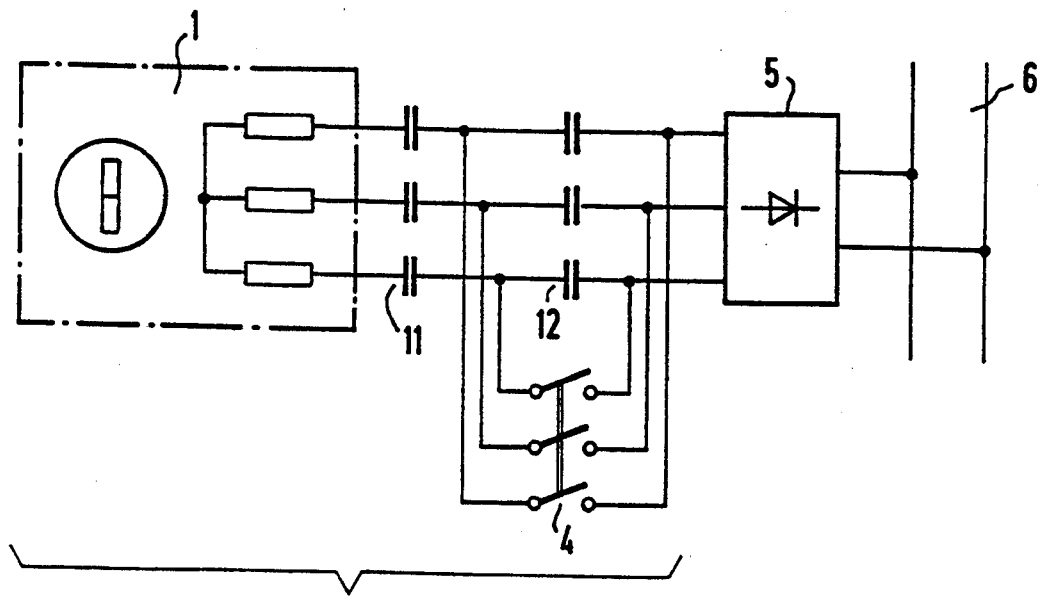
FIG. 3 illustrates a device including one generator, which works per phase winding via two series-connected capacitors for each phase winding according to an embodiment of the present invention.

FIG. 3 illustrates a device including one generator, which works per phase winding via two series-connected capacitors for each phase winding. One of the capacitors for each phase winding is able to be short-circuited by means of a switch that is controlled in dependence upon frequency, by way of a rectifier on a bus bar.

In the device according to FIG. 3, two capacitors 11 and 12 are connected in series with each phase winding of the three-phase generator 1 between generator 1 and the uncontrolled rectifier 5. In operation below the maximum frequency $f_{max}$, the capacitors 12 are short-circuited by the switch 4, which is controlled in dependence upon frequency. An appropriate rating in a greater speed range enables the remaining effective capacitors 11 to produce the desired approximate proportionality between the current and the third power of the generator speed. When the maximum frequency $f_{max}$ is exceeded, the capacitors 12 also carry current due to the opening of the switch 4, and the equivalent capacitance of each phase winding is then diminished by the series connection of the capacitors 11 and 12 in relation to the capacitance of the capacitors 11, to the extent that the resonant frequency is raised to a value lying outside of every operational possibility.

Figure 4:
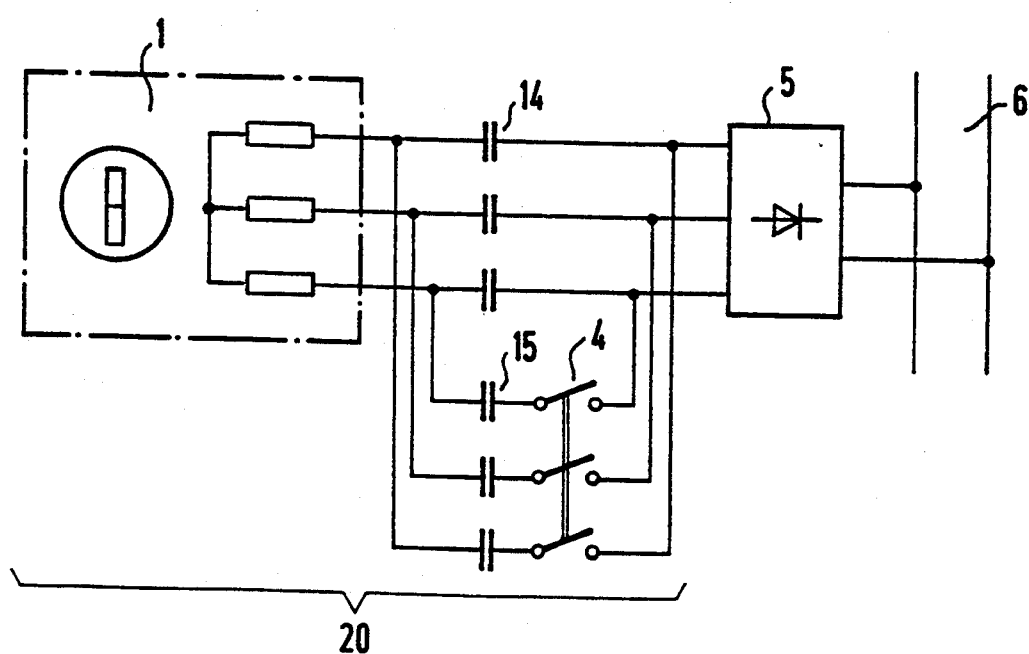
FIG. 4 illustrates a device including one generator, which works per phase winding via two parallel-connected capacitors according to an embodiment of the present invention.

FIG. 4 illustrates a device including one generator, which works per phase winding via two parallel-connected capacitors. One of the capacitors for each phase winding is able to be disconnected, by way of a rectifier on a bus bar.

For each phase winding of the three-phase generator 1, the device according to FIG. 4 includes two capacitors 14 and 15 connected in parallel with each other between the generator 1 and the uncontrolled rectifier 5. Switch 4 is controlled in dependence upon frequency and is connected in series with the capacitors 15 so that this series connection of switches 4 and capacitors 15 is connected in parallel with capacitor 14. Above the maximum frequency $f_{max}$, the capacitors 15 are switched off when the switch 4, which is controlled in dependence upon frequency, is switched off. As in the case of the device according to FIG. 3, this results in a reduction of the effective capacitance and, thus, in an increase of the resonant frequency to a frequency f value in the generator electric circuit, which is not to be expected under field conditions.

The devices according to FIG. 3 and FIG. 4 are depicted with uncontrolled rectifiers 5. However, controlled rectifiers 9 can also be provided, as in the case of the device illustrated in FIG. 2. Furthermore, in the case of the two devices of FIG. 3 and FIG. 4, in the same way as in the case of the device according to FIG. 2, the three-phase generator 1 is not switched off by the actuation of the switch 4, but rather a smaller capacitance becomes effective in the generator electric circuit 20. In this manner, the impedance in the generator electric circuit 20 is increased. Consequently, a current flow and thus a power output still take place in a higher frequency range as well. In this range, the power output by the three-phase generator 1 does in fact remain less than the maximum convertible power. However, here as well, the power goes up with rotational speed. Overloading of the three-phase generator 1 can be prevented by having the maximum permissible frequency for this range obtain a value which cannot be reached even when extreme motive forces act on the turbine.

Figure 5:
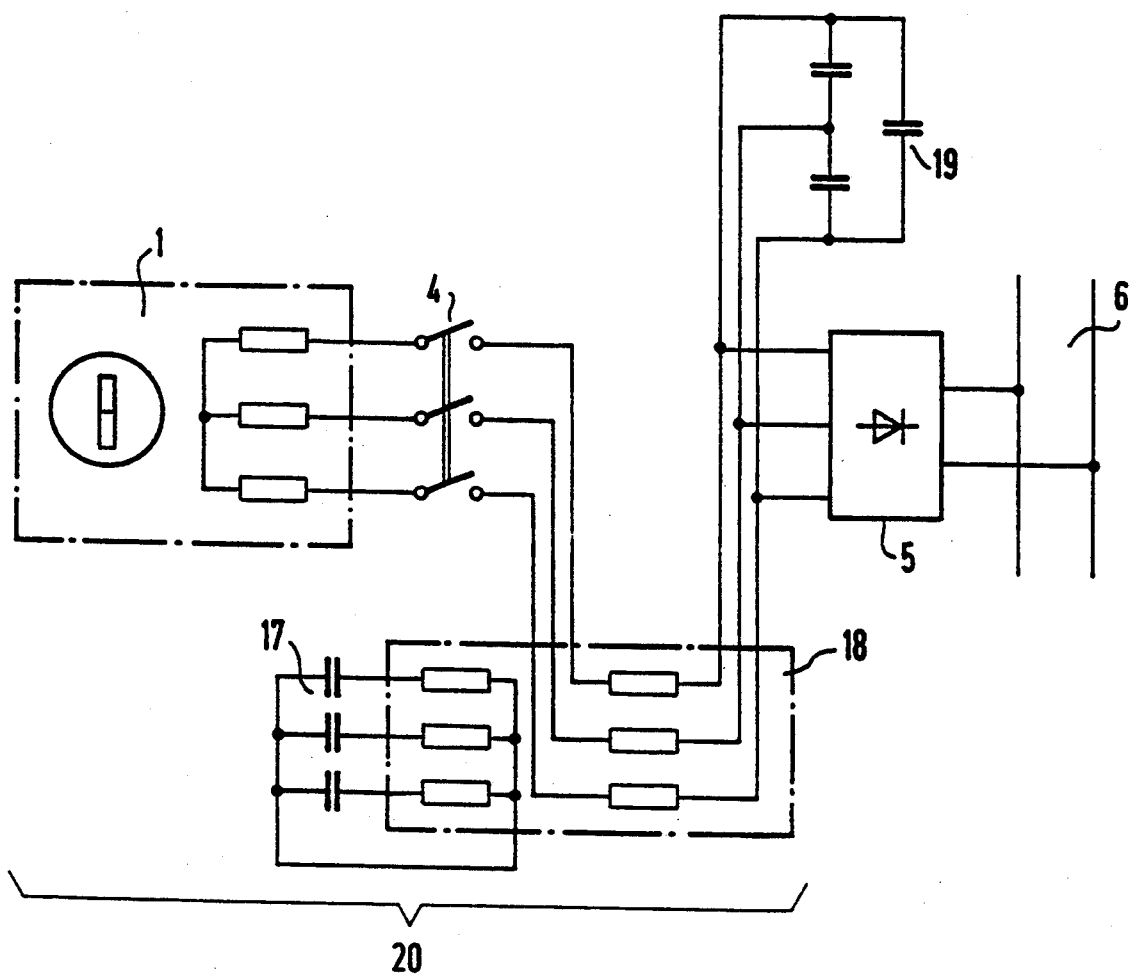
FIG. 5 illustrates a device including one generator, which feeds a rectifier via the low-voltage winding of a transformer according to an embodiment of the present invention.

FIG. 5 illustrates a device including one generator, which feeds a rectifier via the low-voltage winding of a transformer. Power-factor correction capacitors are connected to the input side of the rectifier and capacitors are connected to the high-voltage winding of the transformer.

To be able to occasionally lower the voltage level of the three-phase generators in the configurations according to FIG. 1—FIG. 4 and, at the same time, to reduce the overall space required for the capacitors 3, in the case of the device according to FIG. 5, capacitors 17 are connected to the high-voltage winding of a three-phase transformer 18. The low-voltage winding of three-phase transformer 18 is connected in series between the three-phase generator 1 and the uncontrolled rectifier 5. When the maximum frequency $f_{max}$ is exceeded, the current is interrupted by the switch 4, which is controlled in dependence upon frequency. The three-phase transformer 18 with the capacitors 17 acts on the low-voltage side as a capacitive element, in the same manner as the capacitors 3 in the case of the device depicted in FIG. 1.

To at least partially compensate for the commutation reactive power of the rectifier 5 that rises with frequency, power-factor correction capacitors 19 are connected to the input of the rectifier 5. Such power-factor correction capacitors can also be provided in variants of an embodiment according to any of FIG. 1—FIG. 4. Moreover, the transformer 18 can also be conceived as an autotransformer.

In all of the described configurations, the permanent-magnetic excitation of the three-phase generator 1 can also be replaced by an electric excitation with dc current, which is preferably fed from the output of the rectifier 5. This type of electric excitation is expediently realized as a constant excitation.

What is claimed is:

1. A device for generating electrical energy, comprising:
    a turbine driven by a flowing medium;
    a multiphase alternating-current generator which is coupled to said turbine, said generator including a generator electric circuit;
    a rectifier with impressed output voltage;
    capacitive elements connecting said generator to said rectifier; and
    an oscillating circuit including the capacitive elements and one or more inductors of said generator electric circuit;
    wherein the capacitive elements are valued in relationship to inductances existing in the generator electric circuit to allow a resonant frequency of said oscillating circuit to lie above a highest frequency occurring under field conditions.

2. The device according to claim 1, wherein the alternating-current generator is provided with constant excitation.

3. The device according to claim 2, wherein the alternating-current generator is excited by permanent magnets.

4. The device according to claim 1, wherein said rectifier comprises controllable rectifier elements.

5. The device according to claim 1, further comprising a switch which is controlled in dependence upon frequency and arranged between the alternating-current generator and the rectifier.

6. The device according to claim 5, wherein the switch is connected in series with the alternating-current generator and the rectifier.

7. The device according to claim 5, wherein the switch is arranged in parallel with the capacitive elements.

8. The device according to claim 5, further comprising for each phase winding of the alternating-current generator at least two capacitive elements connected in series, whereby the switch is connected in parallel with one of said two capacitive elements.

9. The device according to claim 5, wherein said capacitive elements comprise at least two parallel-connected capacitive elements for each phase winding of the alternating-current generator, and wherein the switch switches off one of the at least two parallel-connected capacitive elements.

10. The device according to claim 1, wherein at least one component of the capacitive elements are capacitors.

11. The device according to claim 1, wherein at least one component of the capacitive elements one or more comprises a transformer and one or more capacitors which are connected to a high-voltage winding of said transformer, and wherein a low-voltage winding of the transformer is connected in the electric circuit of the alternating-current generator.

12. The device according to claim 11, wherein the transformer is configured in an economizing circuit.

13. The device according to claim 1, further comprising power-factor correction capacitors arranged in parallel with an input of the rectifier.

14. The device according to claim 1, wherein said turbine is driven by a flowing medium comprising wind or water.

15. The device according to claim 1, wherein said rectifier is an uncontrolled rectifier.

16. The device according to claim 1, wherein said rectifier is a controllable rectifier.

* * * * *